United States Patent [19]

Koleda

[11] Patent Number: 4,627,635
[45] Date of Patent: Dec. 9, 1986

[54] VIBRATION DAMPING UNITS AND VIBRATION DAMPED PRODUCTS

[76] Inventor: Michael T. Koleda, 15 Murray Ave., Port Washington, N.Y. 11050

[21] Appl. No.: 619,132

[22] Filed: Jun. 11, 1984

Related U.S. Application Data

[63] Continuation-in-part of Ser. No. 534,065, Sep. 20, 1983, abandoned.

[51] Int. Cl.⁴ .............................................. A63C 5/06
[52] U.S. Cl. .................................... 280/602; 188/268; 267/140.1; 273/73 J; 280/610; 280/809
[58] Field of Search ............... 280/602, 610, 601, 809; 267/140.1, 140.4; 188/268; 428/157; 273/73 J; 411/501, 546

[56] References Cited

U.S. PATENT DOCUMENTS

| | | | |
|---|---|---|---|
| 2,544,028 | 3/1951 | Kjellberg | 280/610 |
| 3,159,249 | 12/1964 | Lazan | 188/268 |
| 3,169,881 | 2/1965 | Bodine | 428/157 |
| 3,327,812 | 6/1967 | Lazan | 188/268 |
| 3,537,717 | 11/1970 | Caldwell | 280/602 |
| 3,601,228 | 8/1971 | Nashif | 188/268 |
| 3,949,988 | 4/1976 | Staufer | 280/610 |
| 4,044,625 | 8/1977 | D'Haem | 273/73 J |
| 4,183,572 | 1/1980 | Albrecht et al. | 188/268 |
| 4,232,762 | 11/1980 | Bschorr | 188/268 |
| 4,293,142 | 10/1981 | Davignon | 280/610 |
| 4,405,149 | 9/1983 | Piegay | 280/602 |
| 4,557,100 | 12/1985 | Gorges | 411/501 |

FOREIGN PATENT DOCUMENTS 2434423 2/1975 Fed. Rep. of Germany ...... 280/610

*Primary Examiner*—David M. Mitchell

[57] ABSTRACT

Flexible vibration damping units, and vibratile products including flexible vibration damping units as components thereof, are provided wherein, in the vibration damping unit, at least one laminar group of flexible strip portions of a flexible framework is included having flexible longitudinally free-ended strip portions in the group firmly secured in the framework to one of the flexible strip portions in the group so as to have the strip portions in the group flex, and relatively move longitudinally with reference to one another, when the framework is flexed, this with the vibration damping unit further being characterized by including visco-elastic means, preferably of a visco-elastic adhesive kind, between the interfacially opposed flexible strip portions in the laminar group and engaging the flexible strip portions in that group so as to damp the longitudinal relative movements of the flexible strip portions in the group when the framework is flexed.

34 Claims, 35 Drawing Figures

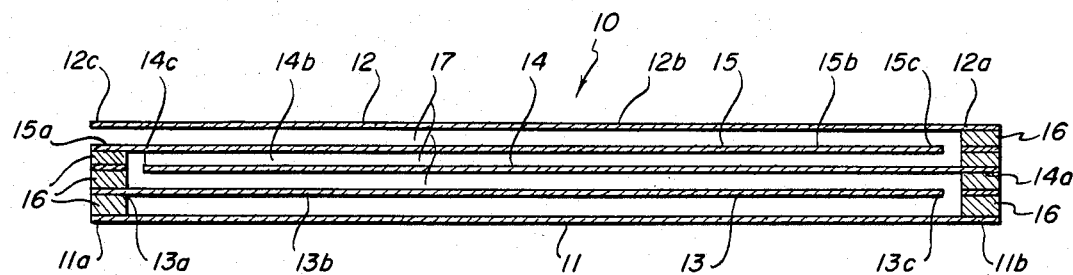
Fig. 1
Fig. 3
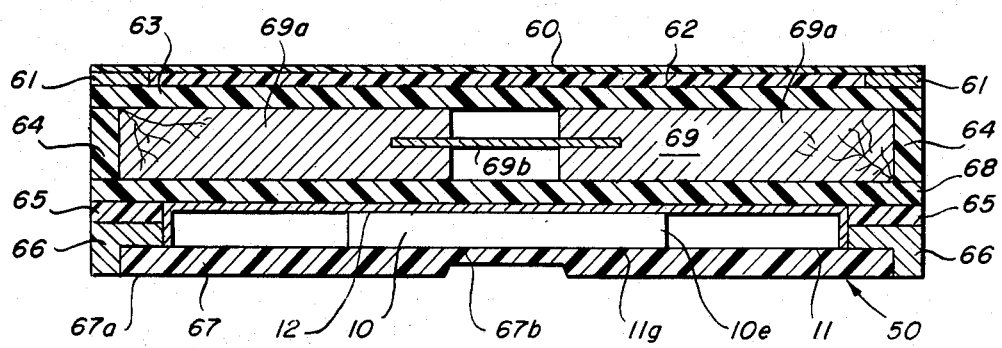
Fig. 7
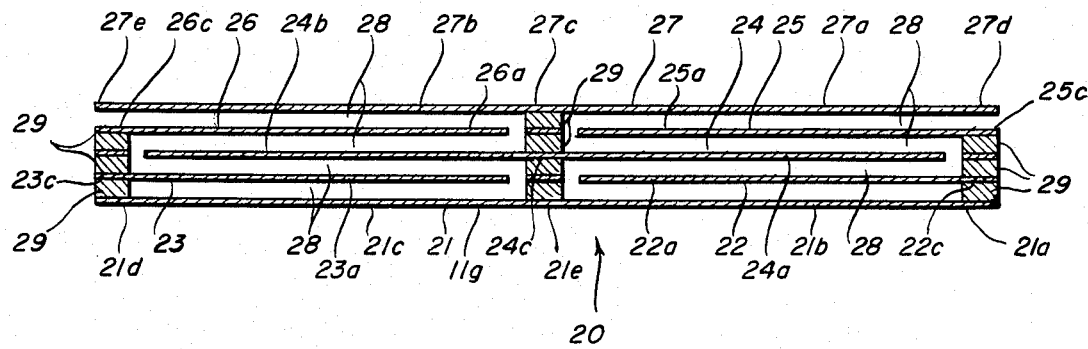

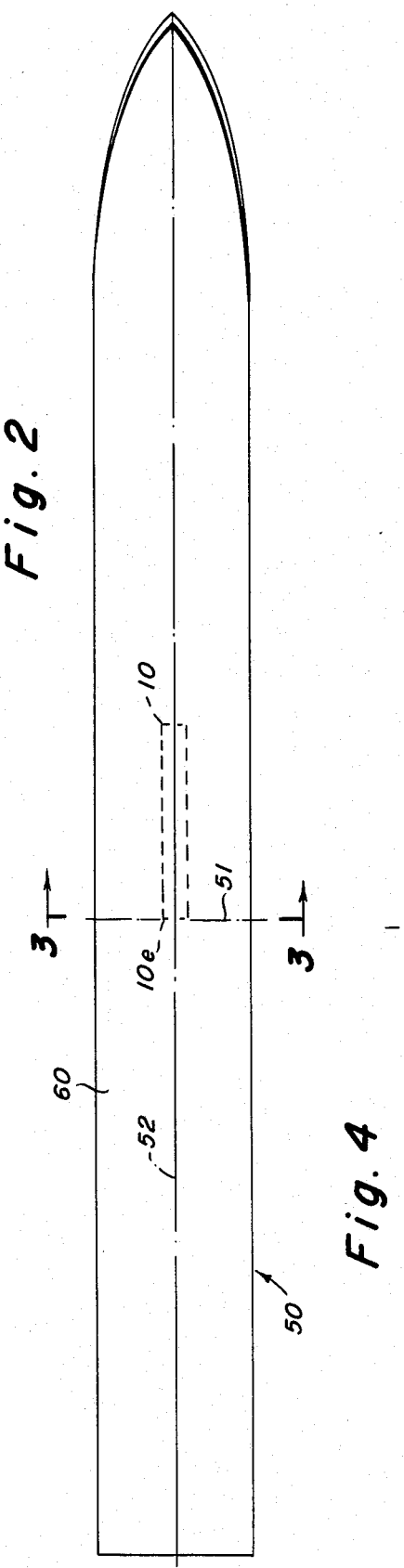
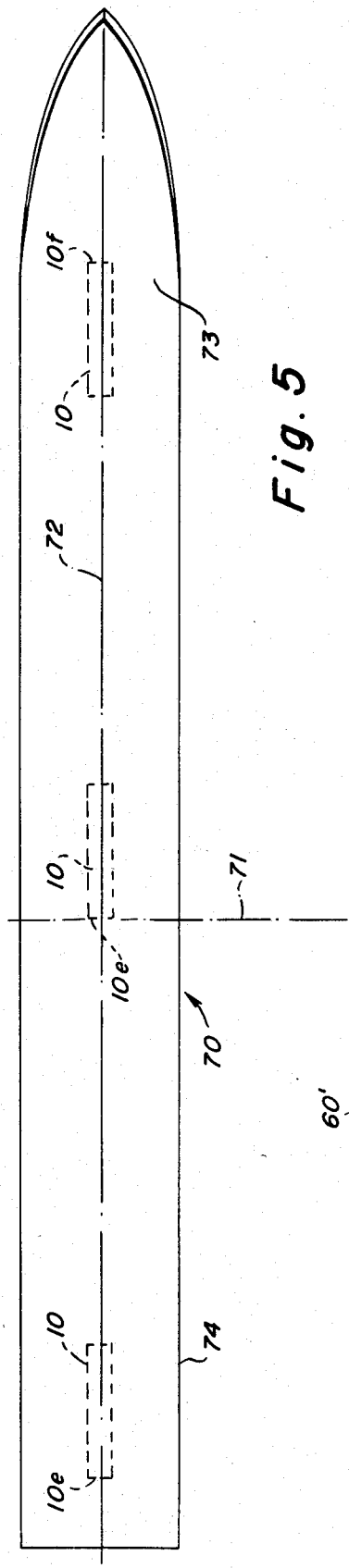
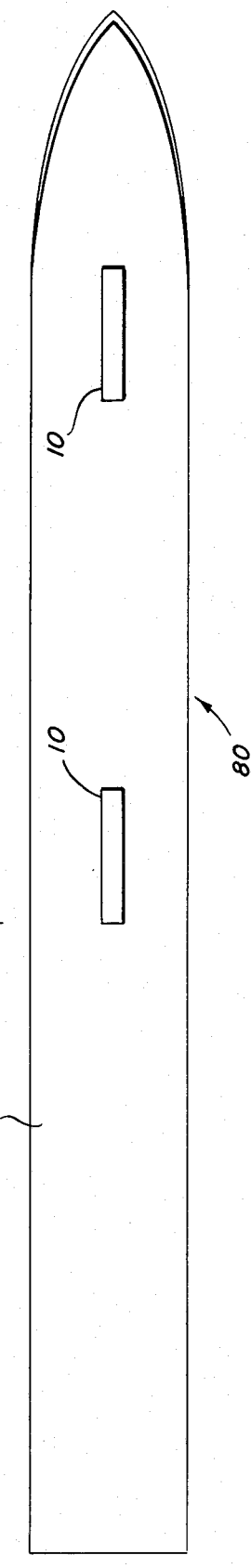

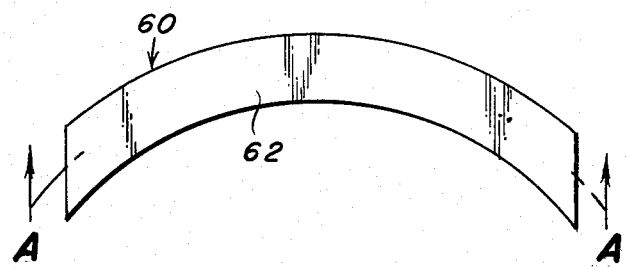
Fig. 10
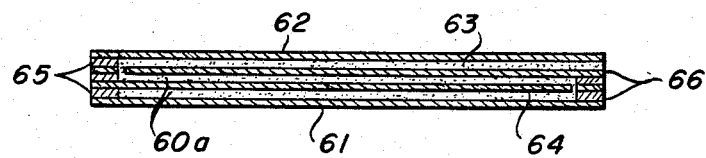
Fig. 11
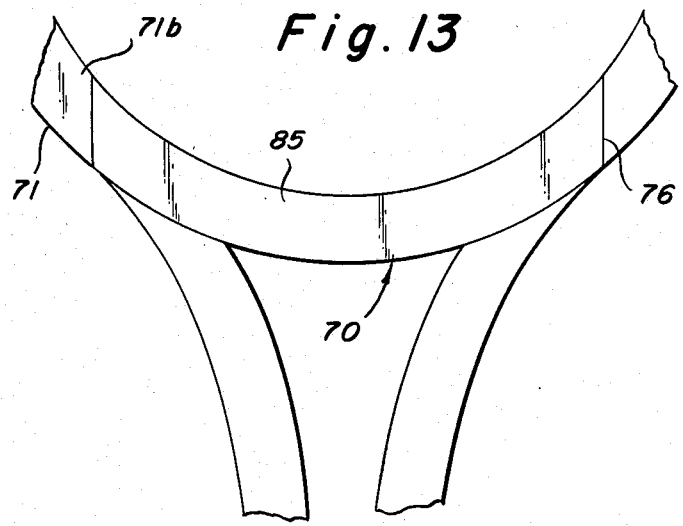
Fig. 13
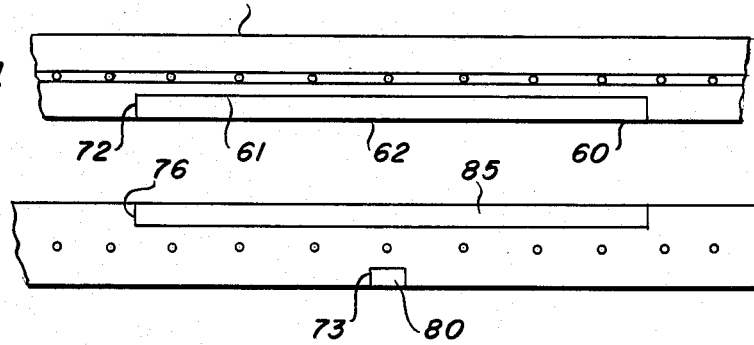
Fig. 14
Fig. 15

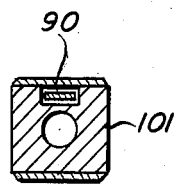
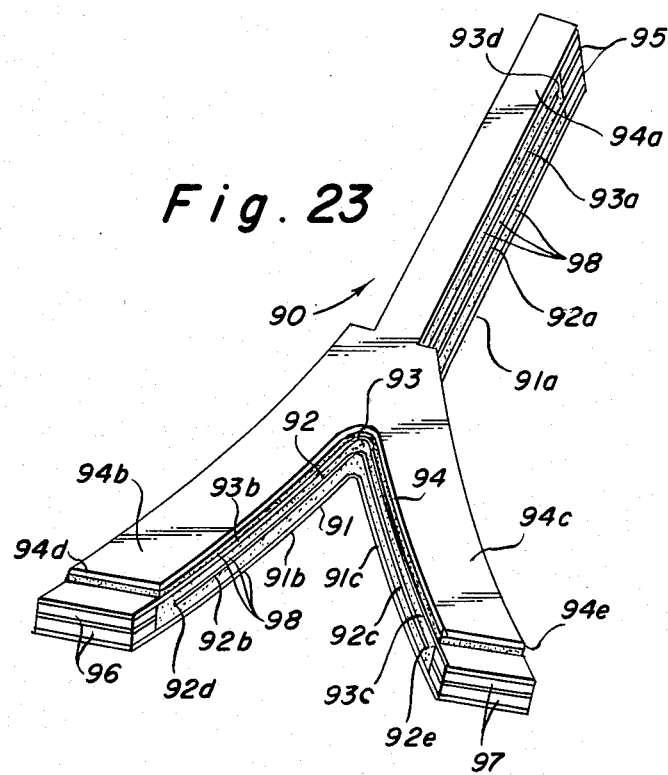
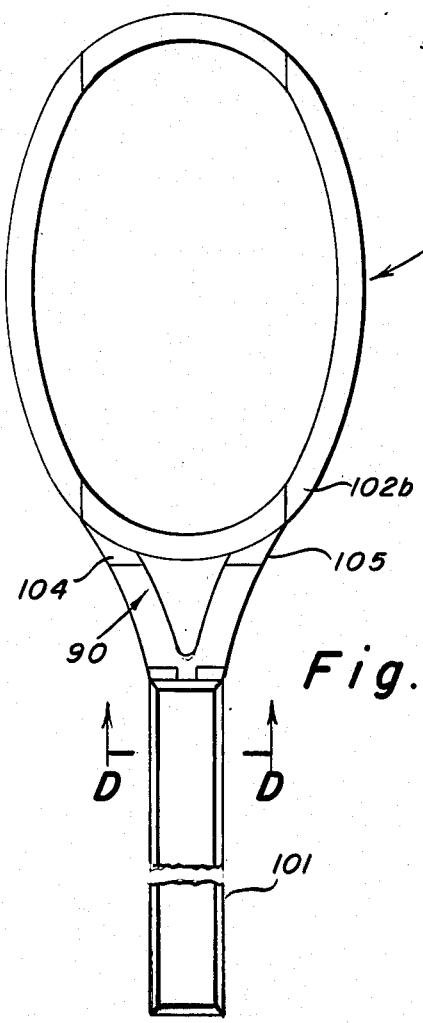
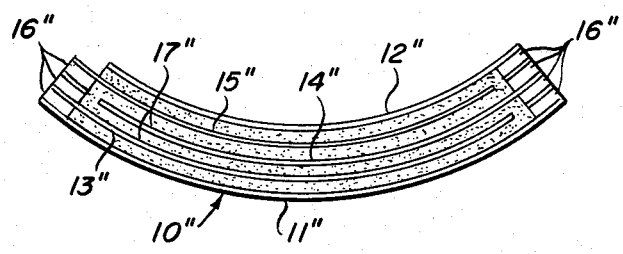
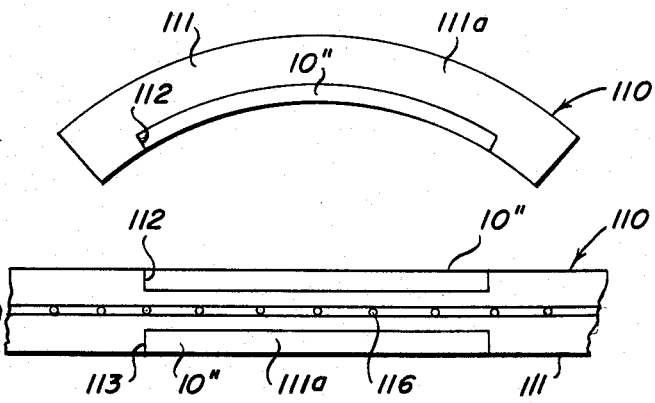

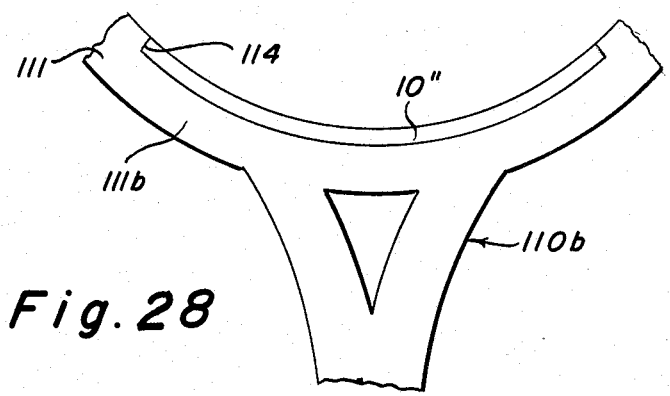
Fig.28
Fig.30
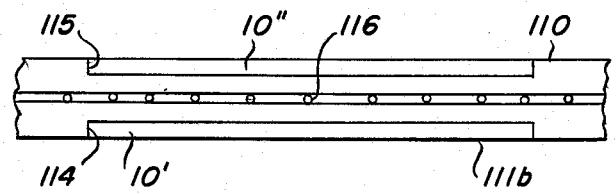
Fig.31
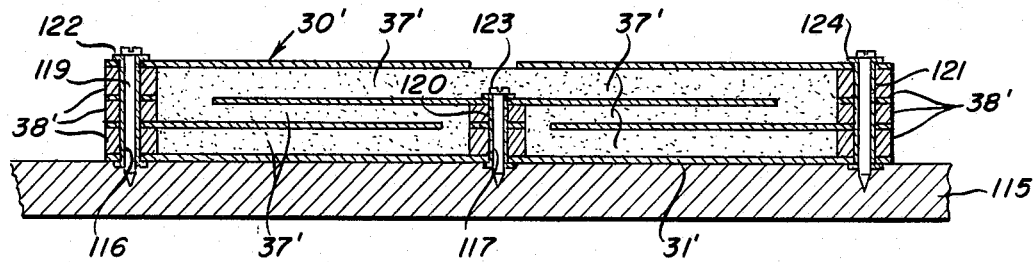
Fig.32
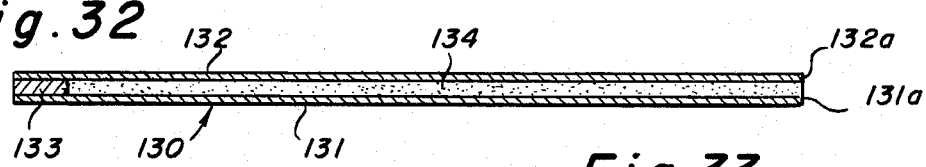
Fig.33
Fig.34
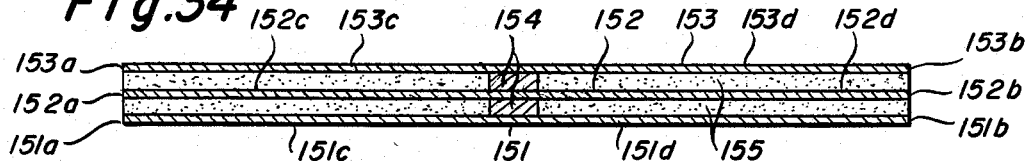
Fig.35
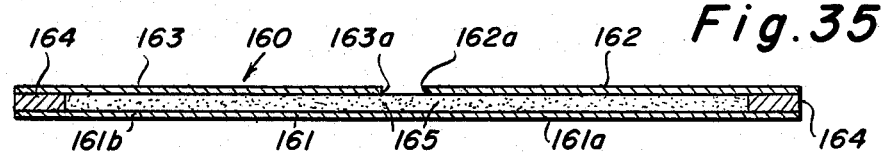

VIBRATION DAMPING UNITS AND VIBRATION DAMPED PRODUCTS

This invention relates to vibration damped vibratile products, and to vibration damping units for use as components of vibratile products for damping vibrations of those products, and the present application is a continuation-in-part of application Ser. No. 534,065 filed Sept. 20, 1983 and now abandoned.

An object of this invention is to provide flexible vibration damping units for use as components of vibratile products and to have laminae and visco-elastic means in the unit interrelated in a worthwhile manner, for vibrations of the vibratile product to be damped through flexural relative movements of the laminae with reference to one another being retarded by the visco-elastic means in the unit.

Another object of this invention is the provision of a flexible vibration damping unit for use as a component of a vibratile product, with the unit being characterized by including a framework wherein flexible laminae are firmly secured together and the laminae relatively movably with reference to one another are adapted to co-act with visco-elastic means between the laminae when the unit is flexed.

A further object of this invention is the provision of a flexible vibration damping unit for spot use as a component of a vibratile product and to combine, in this unit, firmly securely connected longitudinally relatively movable laminae with visco-elastic means interposed between the laminae, and to afford compactly an appreciably large total surface area of the laminae which co-acts with the visco-elastic means in the unit.

Another object herein in that of providing a vibratile product including at least one spot-located flexible laminar unit, of the character indicated, operatively interrelated therewith.

Other objects of the present invention in part will be obvious and in part pointed out more fully hereinafter.

As conducive to a clearer understanding of certain aspects of the present invention, it is noted at this point that a wide variety of vibratile products, during or after their production, are often needful of being equipped to suppress vibrations later to be developed within the body of the product. Among the many products within this general category are, by way of example, skis, whether for land or water use, hand-held impact implements such as tennis or badminton rackets, golf clubs, hammers, sledges and earthdigging implements, diving boards, helicopter blades, air foils, musical instruments having particular vibrations which desirably are to be suppressed, shipping cartons with vibratile walls or partitions, and structural panels, per se, tending to transmit sound or other vibrations, such as when installed in a building, a land vehicle or in an aircraft or marine craft.

The present invention accordingly provides vibration damping units as components for damping vibrations such as in the aforementioned and indeed numerous other vibratile products.

It is observed by way of example that when land skis vibrate or flutter during travel at high speeds on icy slopes, or under other conditions of use, this hampers control, especially at turns along the course of travel, and, in the spirit of alleviating difficulties encountered with vibrations or flutter, the prior art offers to add vibration or flutter damping means including a visco-elastic substance to skis either by providing the vibration damping means substantially throughout the length of the ski inside the body of the ski, as in U.S. Pat. No. 4,293,142 Davignon, or spot-located along the upper outside face of the ski, as proposed in U.S. Pat. No. 3,537,717 Caldwell. U.S. Pat. No. 3,844,576 Schultes offers a further example of ski damping means interiorly of the ski body and introduces in the damping unit, which extends longitudinally throughout substantially the full length of the ski body, a strip enshrouded by or layered with a visco-elastic substance applied to the interior wall structure of the ski, having the strip anchored at one protruding longitudinal end portion directly to the wall structure of the ski. In using vibration damping means added throughout substantially the length of the ski, there is a tendency to deaden the ski unduly. Further, when considering spot-located external damping means according to U.S. Pat. No. 3,537,717 Caldwell, a flexible strip is used covered on one side with a visco-elastic substance and is applied to the ski having the visco-elastic substance next to the upper outside face of the ski body and, if desired, the remaining exposed face of the strip is covered with one or several superimposed strips, having a visco-elastic substance adjacent to the upper face of the strip next underneath, to contribute a vibration damping effect. Layering of strips as proposed in U.S. Pat. No. 3,537,717 Caldwell relies, without any unitary framework, only upon use of a lost motion thrust coupling afforded by the visco-elastic substance between any pair of strips and moreover would leave one of the strips in the pair prone to drift longitudinally relatively to the other of the strips in the pair and become dislocated as flexing continues.

By way of further example herein, stringed rackets, such as tennis rackets or badminton rackets, after impact in normal use are prone to vibrate in the string frame and transmit vibrations from the string frame to the handle. In U.S. Pat. Nos. 4,082,273 Ellzey, 4,105,205 Theodores and British Pat. No. 803,782, there is prior art for damping vibrations in stringed rackets; however, no vibration damping unit is provided with any laminarly grouped portions being in a flexible framework wherein the strip portions are firmly secured together and associated with visco-elastic means to co-act while still being longitudinally relatively movable with reference to one another in the framework when the framework is flexed.

A further object of this invention accordingly is to provide a flexible laminar vibration damping unit to be spot-located along the length of a vibratile product as a supplement to the body of the product, and in this to introduce a plurality of laterally opposed strips which in flexing are adapted to move relatively to one another while engaged with visco-elastic means between the strips and while the strips supplementally are firmly secured together in a skeletal framework in the unit to assure positive coupling under thrust and to resist strip dislocation.

In accordance with the present invention, laminar units for use as components of vibratile products to damp vibrations of the vibratile products are provided. The units are characterized by including, in the unit, a flexible framework, comprising at least one laminar group wherein flexible first strip means of the framework and longitudinally free-ended strip means of the framework are provided. The first strip means includes for the group a flexible first strip portion of the framework, and the longitudinally free-ended strip means comprises for the group at least one flexible longitudinally free-ended strip portion of the framework firmly secured to the framework first strip portion in the group, having the framework strip portions in the group in a longitudinally relatively movable interfacial relation to one another, for the framework strip portions in the group to be flexed and longitudinally relatively move with reference to one another. Visco-elastic means situated between the framework strip portions in the aforementioned group visco-elastically engages the framework strip portions in that group with one another, so that the framework strip portions, upon being flexed in the group, will longitudinally relatively move with reference to one another and have those relative movements retarded by the visco-elastic means, such as when the vibration damping unit is used as a component of a vibratile product and is responding to vibrations of the vibratile product.

In certain more particularly defined embodiments in accordance with the present invention vibration damping units are introduced for damping vibrations of vibratile products and are characterized by including, in the unit, first and second laterally opposed strip means and intermediate strip means disposed between the laterally opposed first and second strip means. Longitudinally free-ended strip portions of the aforementioned intermediate and second strip means lap one another longitudinally in a sequence initiated from one of the two opposite longitudinal end portions of the aforementioned first strip afforded by the first strip means and are firmly secured progressively to one and the next of those two opposite longitudinal end portions of the first strip in a flexible framework having the longitudinal lead of one and the next of the longitudinally free-ended lapped strip portions progressively reversed. The longitudinally free-ended lapped strip portions have longitudinal reach in the unit and are engaged with the first strip and with one another by visco-elastic means in the unit so as longitudinally relatively to move laminarly with reference to one another and with reference to the first strip, in the unit, when the unit is flexed in response to vibrations of a vibratile product, and have those movements damped by the visco-elastic means.

According to certain other more particular embodiments of this invention, a first flexible strip afforded by the first of two laterally opposed strip means, and a plurality of longitudinally free-ended flexible strip portions afforded by intermediate strip means and the second of the two laterally opposed strip means, are interrelated in a vibration damping unit having the longitudinally free-ended strip portions firmly secured to the first strip portion to be in a flexible framework with the first strip wherein the longitudinally free-ended strip portions lap one another in a plurality of sequences each initiated from the first strip with the longitudinal lead of one and the next of the longitudinally free-ended lapped strip portions in the sequence being progressively reversed. Among vibration damping units so characterized are those wherein one or more strips, each being inclusive of a pair of the longitudinally free-ended portions in the damping unit is or are interconnected by a connective portion of the strip firmly secured to an intermediate portion of the first strip, and other of the longitudinally free-ended strip portions in the unit are members of strips which have connective portions thereof firmly secured either to one or the other of opposite longitudinal end portions of the first strip to dispose the several longitudinally free-ended strip portions longitudinally lapped with one another in two sequences each initiated from the first strip, having the longitudinal lead of one and the next of the longitudinally free-ended strip portions in the sequence progressively reversed. Vibration damping units using plural sequences of the character described are further characterized by reach of the longitudinally free-ended strip portions in the sequence being adequate for the framework of the unit to be flexed in response to vibratile product vibrations and the longitudinally free-ended strip portions relatively to move one with reference to another in the sequences and relatively to the first strip, longitudinally laminarly, while visco-elastic means also used in the unit and disposed between the first strip and the longitudinally free-ended strip portions in the sequences damps those movements in response to the vibratile product vibrations.

Vibration damping units in accordance with the present invention are operatively installed in certain instances either wholly inside or wholly outside the bodies of vibratile products as vibration damping components of the products, and in certain other instances are installed operatively to be in part inside and in part outside the bodies of the vibratile products as vibration damping components of the products, all as will be realized from illustrative embodiments which are hereinafter set forth.

In the accompanying drawings, representing embodiments of this invention, and including embodiments thereof which are presently preferred:

FIG. 1 is a longitudinal cross-sectional view of a vibration damping unit for use with a vibratile product;

FIG. 2 is a schematic plan view of a vibratile product in the form of a ski having one of the vibration damping units of FIG. 1 installed inside the ski;

FIG. 3 is a transverse cross-sectional view taken at 3—3 in FIG. 2;

FIGS. 4 and 5 are schematic plan views of skis wherein, in FIG. 4, vibration damping units according to FIG. 1 are located inside the ski, and in FIG. 5 are located outside the ski;

FIGS. 7, 8 and 9 are longitudinal cross-sectional views representing other vibration damping units for vibratile products according to modified embodiments of this invention;

FIG. 10 is a plan view of a curved and thus modified vibration damping unit;

FIG. 11 is a longitudinal sectional elevation of the vibration damping unit represented in FIG. 10, the section being along line A—A in FIG. 10;

FIGS. 12 and 13 are opposite side elevational views of a tennis racket including vibration damping units in situ as components thereof;

Figure 12:
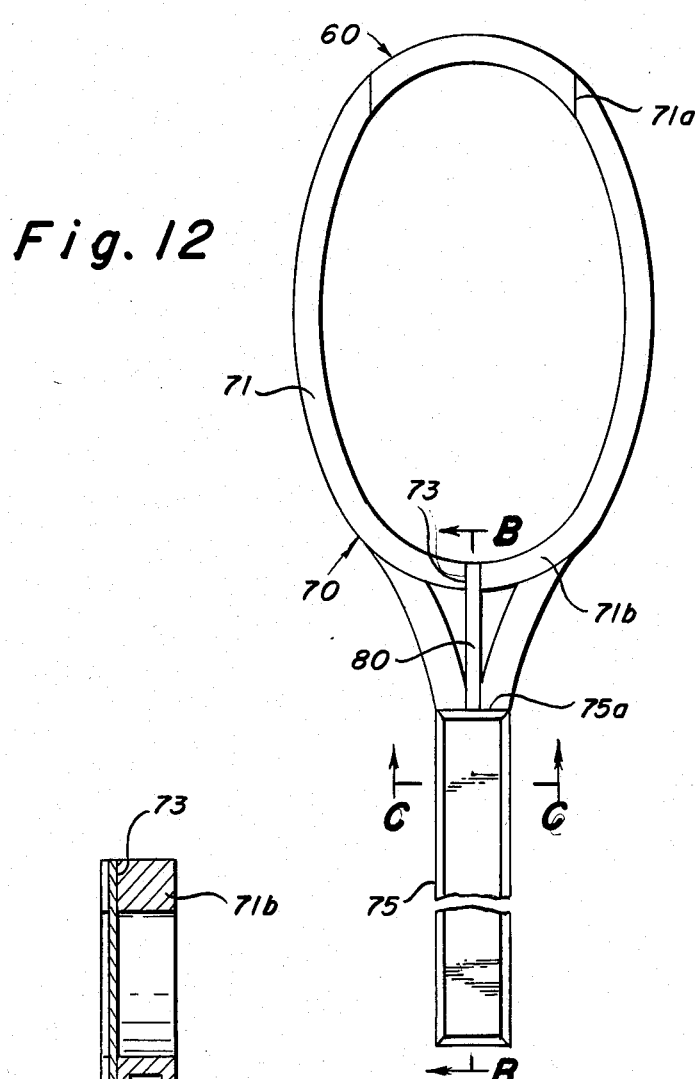
Figure 16:
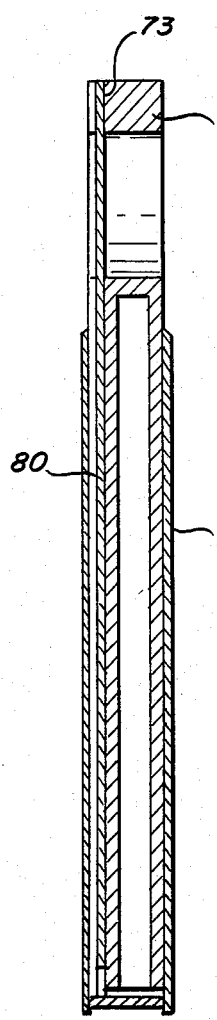
Figure 17:
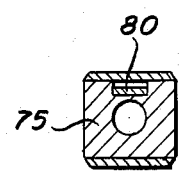
Figure 18:
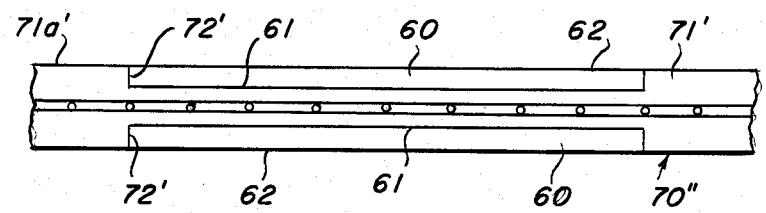
Figure 19:
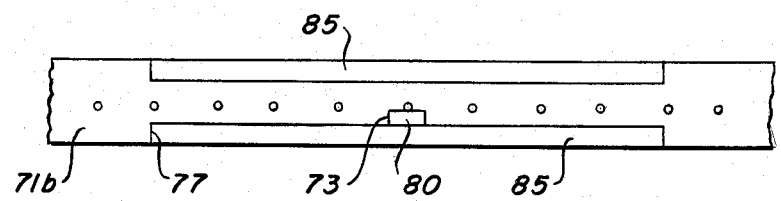
Figure 20:
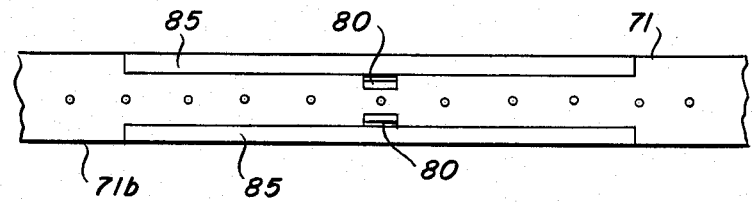
Figure 21:
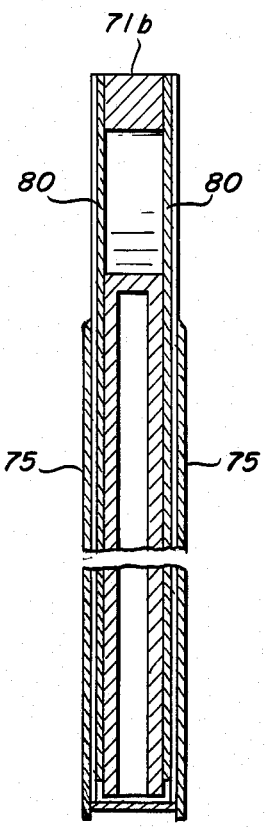
Figure 22:
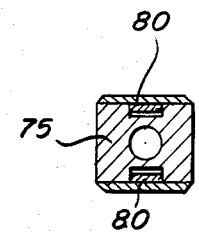

FIGS. 14 and 15 correspond to FIGS. 12 and 13 and are outside and inside end views respectively of the outermost and innermost portions of the string frame of the racket in FIGS. 12 and 13;

FIGS. 16 and 17 one and the other are longitudinal and transverse cross sections of the FIG. 12 racket handle structure, the sections respectively being along lines B—B and C—C in FIG. 12;

FIGS. 18 and 19 are details, comparable with FIGS. 14 and 15, of modified structure of a tennis racket with vibration damping means;

FIG. 20 is a view comparable with FIG. 19 and represents other modified tennis racket details and related vibration damping means;

FIGS. 21 and 22 accompany the details of FIG. 20 and are comparable with FIGS. 16 and 17;

FIG. 23 is an isometric view representing still another structurally modified vibration damping unit;

FIG. 24 is a side elevation of another tennis racket and related vibration damping units thereof;

FIG. 25 is a transverse cross-sectional elevation along line D—D in FIG. 24;

FIG. 26 represents in side elevation still another modified vibration damping unit; FIGS. 27 and 28 are corresponding opposite side elevational views of outermost and innermost portions of a tennis racket string frame having vibration damping units of the character of FIG. 26 as components thereof;

FIGS. 29 and 30, respectively, are outermost and innermost inside end views of the racket string frame represented in FIGS. 27 and 28;

FIG. 31 is a longitudinal cross-sectional view of another vibration damping unit and showing the unit installed; and FIGS. 32 to 35 are longitudinal cross-sectional representations of still other vibration damping units which are also within the scope of this invention.

Referring now more particularly to practices of the present invention and to the embodiment represented in FIG. 1 of the accompanying drawings, a vibration damping unit 10 is provided comprising first and second laterally opposed cover strips 11 and 12 and a plurality of intermediate strips 13, 14 and 15, which notably are three in number in the present embodiment. All of the aforementioned strips are substantially equal in width to one another and are laminarly interrelated, the intermediate strips 13, 14 and 15 accordingly being covered by the first and second strips 11 and 12. Connective longitudinal end portions 13a and 15a of the intermediate strips 13 and 15 are firmly secured to longitudinal end portion 11a of the first cover strip 11, and connective longitudinal end portions 12a and 14a of the second cover strip 12 and the intermediate strip 14 are firmly secured to the opposite longitudinal end portion 11b of the first cover strip 11.

The firm securements referred to above as being in the unit 10 include lateral spacer means in the form of a plurality of shims 16 whereby the intermediate strips 13, 14 and 15 and the second cover strip 12 are laterally offset from one another and from the first cover strip 11 adjacent to the firm securements. Thus, in the present embodiment, the firm securements are achieved by securing together the longitudinal end portion 11a of the first cover strip 11, the connective longitudinal end portions 13a and 15a of the intermediate strips 13 and 15, and those of the intermediate shims 16 related thereto, such as through use of a two-part epoxy cement or any other firmly setting adhesive, and by likewise securing together the opposite longitudinal end portion 11b of strip 11, the longitudinal end portions 12a and 14a of the second cover strip 12 and the intermediate strip 14, and those of the intermediate shims 16 related thereto.

The laterally opposed cover strips 11 and 12 and the intermediate strips 13, 14 and 15 all are flexibly resilient in responding to vibrations, and for example the several strips referred to are made of a hard flexible thermally set resin either with or without having a filler such as a layer of woven fabric, or other reinforcing material or materials, embedded therein, or of resilient metallic material such as an aluminum base alloy or steel, of any suitable grade. If desired, the materials used in the strips may of course differ among the strips or within the strips themselves. A quite satisfactory strip material used for the purpose is a composite including an epoxy resin wherein woven graphite sheeting is embedded having the resin thermally set to lend flexibility and resilience, one such composite product being offered under the trade name "Magnamite" by Hercules Incorporated.

Notably, longitudinally free-ended strip portions 13b, 14b and 15b of the intermediate strips 13, 14 and 15 longitudinally are foreshortened to present longitudinal free ends 13c, 14c and 15c which are spaced an appreciable distance away from the adjacent shim means 16 thus relatively to move longitudinally laminarly with reference to one another and with reference to the first and second cover strips 11 and 12 when the unit 10 is flexed. The cover strip 12 meanwhile introduces a strip portion 12b having a longitudinal free end 12c movably outside the connective longitudinal end portion 15a of the intermediate strip 15 and, as preferred, is substantially of the same length as the first cover strip 11.

The outside cover strips 11 and 12 and the intermediate strips 13, 14 and 15 are members of a flexible framework wherein the longitudinally free-ended portions 13b, 14b and 15b of the intermediate strips 13, 14 and 15 and the longitudinally free-ended portion 12b of the second cover strip 12 in sequence, initiated from the firm securement of the connective longitudinal end portion 13a to the longitudinal end portion 11a of the first cover strip 11, progressively one to the next have a reversed longitudinal lead and are longitudinally lapped with one another to effect relative longitudinal movement with reference to one another and to the first cover strip 11 when the framework is flexed. It will be observed, too, that the opposite longitudinal end portions 11a and 11b of the first cover strip 11, one and then the other progressively, have the connective longitudinal end portions 13a, 14a and 15a of the intermediate strips 13, 14 and 15 and the connective longitudinal end portion 12a of the second cover strip 12 one and the next sequentially firmly secured thereto adjacent to the shims 16 in the flexible framework so as to maintain the related longitudinally free-ended strip portions spaced laterally apart from one another adjacent to the shims 16.

Visco-elastic means 17 in the unit 10 visco-elastically interengages the first cover strip 11 and the longitudinally free-ended portions 13b, 14b and 15b of the intermediate strips 13, 14 and 15 along with the longitudinally free-ended portion 12b of the second cover strip laminarly, for the unit 10 when secured to a vibratile product spot-located on the vibratile product to flex in response to vibrations of the vibratile product and damp those vibrations. In use of the unit 10, the first cover strip 11 is secured to the body of the vibratile product in any suitable manner, such as by cementing with a two-part epoxy adhesive or the like, having for example the first and second cover strips 11 and 12 and the intermediate strips 13, 14 and 15 longitudinally directed lengthwise of the vibratile product, so that the strips in the unit 10 will flex in response to the vibratile product vibrations and relatively move longitudinally with reference to one another while those movements are damped visco-elastically by the visco-elastic means 17. A tack adhesive visco-elastic substance of the visco-elastic means 17 is beneficial, such as a silicone type material produced by C. E. Niehoff and Company and marketed as "Niehoff NL-3", for such adhesives serve to bond the strips in the vibration damping unit laminarly together while also producing a vibration damping effect visco-elastically between the strips. To facilitate an understanding of the framework structure which is involved, the vibration damping unit 10, and most of the other vibration damping units disclosed in the accompanying drawings, are represented as having spacings between the grouped resiliently flexible strip portions in the damping unit framework which are larger than those most often employed. When, as preferred, tacky visco-elastic adhesive means is included in the vibration damping units, this material usually takes the form of a thin layer reaching laterally from one to the next of the resiliently flexible strip portions of the framework, and thus the resiliently flexible strip portions of the framework are directly bonded laminarly together interfacially and visco-elastically by the adhesive thin layer means, such as with the latter in layer being even thinner than each of the adjacent resiliently flexible strip portions of the framework. Other visco-elastic materials, which at times are substituted for a tacky visco-elastic adhesive still in accordance with the present invention, have a dough-like consistency enabling lamina of the visco-elastic material to be formed and interposed laminarily between the strips and be secured to the strips in the vibration damping unit with a suitable adhesive. To accommodate this, the spacing between the flexible strip portions of the framework is altered as need may be.

Unit 10, though having the first and second cover strips 11 and 12 substantially fully interpose therebetween the intermediate strips 13, 14 and 15 along with the shim means 16 and the visco-elastic means 17, as preferred, is readily handled and installed without appreciable contact with the visco-elastic means 17.

Toward providing examples of vibratile products which are combined with vibration damping units in accordance with this invention, reference is had to the embodiment represented in FIGS. 2 and 3, and to other embodiments represented in FIGS. 4 and 5. In FIGS. 2 and 3, a vibratile product of the form of a ski 50 has a top plastic layer 60, between which and a fiberglass load bearing full width layer 63 there are opposite protective side strips 61 of metal, such as aluminum base alloy, flanking a load bearing narrow layer 62 of fiberglass. A core 69, wherein two wooden side layers 69a are interconnected by a strip 69b such as of steel, is flanked by a pair of phenolic type side walls 64 and is sandwiched, along with the side strips 64, between the load bearing fiberglass full width layer 63 and another load bearing fiberglass full width layer, designated 68. There are spacer layers 65 such as of plastic on opposite sides of the ski 50 and these spacer layers are situated between the load bearing fiberglass full width layer 68 and a pair of steel runner members 66, the latter members being L-shaped in cross-section while having an intermediate bottom layer 67 of polyethylene against legs of those members. The above-described structure of ski 50 is sustained preferably through use of suitable connections such as adhesive bonds.

One of the vibration damping units 10 hereinbefore described is constructed to be about 2 millimeters thick and in plan about 2 centimeters wide and approximately 45 centimeters long and has its rearward longitudinal end 10e (see FIGS. 2 and 3) disposed at about the transverse centerline 51 of ski 50, which nominally is a ski 200 centimeters in length. The vibration damping unit 10 forwardly leads centered on the longitudinal centerline 52 of ski 50, having the first cover strip 11 secured at outside 11g of strip 11 by epoxy cement to the inner face 67b of the polyethylene layer 67 (see FIG. 3) which forms an outer running face 67a of ski 50 and enables the unit 10 to flex with ski 50 in response to vibrations of ski 50. Meanwhile, the second cover strip 12 in the vibration damping unit 10 is disposed relatively to the load bearing fiberglass layer 68 so as longitudinally to move free-ended relatively to the layer 68 under constraint of the visco-elastic means 17 inside the unit 10 when unit 10 flexes in response to vibrations of the ski 50.

According to the embodiment in FIG. 4, three vibration damping units 10, each constructed also to be about 2 millimeters thick and about 2 centimeters wide, but in this about 30 centimeters long, are combined with a 200 centimeter ski 70 similar in structure to that of ski 50 in FIGS. 2 and 3. A first of these three ski vibration damping units 10 is situated having its forward longitudinal end 10f opposite the forward touchdown portion 73 of the ski 70 and longitudinally leads rearwardly and centered on the longitudinal centerline 72 of the ski 70. The second of the units 10 has the rearward longitudinal end 10e thereof at approximately the transverse centerline 71 of ski 70 and in leading longitudinally forwardly is centered on the longitudinal centerline 72 of ski 70. The last of the three units 10 is disposed with its rearward end 10e opposite the rear touchdown portion 74 of ski 70 and in leading longitudinally forwardly is centered on the longitudinal centerline 72 of ski 70. All three of the units 10 are situated inside the ski body in the position indicated and are secured to and interrelated with the ski body in a manner already described with reference to the FIG. 2 embodiment.

In FIG. 5, a ski 80, also 200 centimeters in length, is by way of example without a ski vibration damping unit thereon at the rear and relies upon two forward vibration damping units 10 dimensioned about the same as the two forward damping units in FIG. 4. In this instance, the two vibration damping units 10 are located in much the same general positions along the length of ski 80 as are the forward two vibration damping units for ski 70 in FIG. 4, but are disposed externally of the ski 80 having their first cover strips 11 secured at outer face to the top layer 60' of ski 80, for these units 10 to flex with ski 80 and damp vibrations of the ski.

Figure 6:
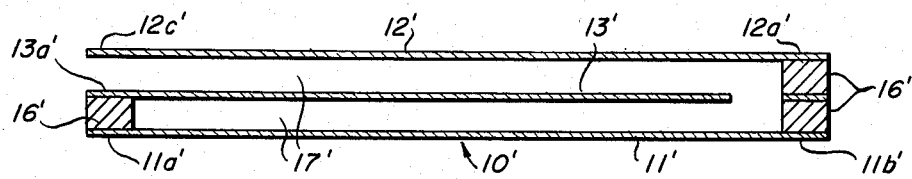
FIG. 6 is a longitudinal cross-sectional view of a vibration damping unit generally in accordance with the unit of FIG. 1, but using a reduced number of strips in the framework.

In an embodiment of the present invention represented in FIG. 6, the first and second cover strips 11' and 12' in a vibration damping unit 10' for vibration products are associated with only one intermediate strip therebetween, this being designated by the reference numeral 13'. In a progression of connections similar to that used in the FIG. 1 embodiment, a connective longitudinal end portion 13a' of the intermediate strip 13' is firmly secured through shim means 16' to a longitudinal end portion 11a' of the first cover strip 11' and a connective longitudinal end portion 12a' of the second cover strip 12' is firmly secured through further portions of the shim means 16' to the opposite longitudinal end portion 11b' of the first cover strip 11', leaving a free longitudinal end 12c' of the second cover strip 12' laterally outside the connective longitudinal end portion 13a' of the intermediate strip 13', with the intermediate strip 13' longitudinally being foreshortened, for the unit 10' to be flexurally used with visco-elastic means 17' also present, for purposes similar to those hereinbefore described with reference to the FIG. 1 embodiment.

Turning now to an embodiment of this invention according to FIG. 7, a vibration damping unit 20 is characterized by two sequences of longitudinally lapped free-ended resiliently flexible strip portions both initiated from a first resiliently flexible cover strip 21. In each of the sequences, the longitudinal lead of the free-ended strip portions reverses from free-ended strip portion to free-ended strip portion progressively throughout the sequence. Thus, it will be seen that in the first of the two sequences longitudinally free-ended strip portions 22a, 24a, 25a and 27a are involved and that in the other of the two sequences the longitudinally free-ended strip portions 23a, 24b, 26a and 27b are involved. The longitudinally free-ended strip portions 22a and 25a are members of resiliently flexible intermediate strips 22 and 25 in the unit 20 which include connective longitudinal end portions 22c and 25c firmly secured to a first longitudinal end portion 21a of the first cover strip 21, while the longitudinally free-ended portions 23a and 26a are members of resiliently flexible strips 23 and 26 which have connective longitudinal end portions 23c and 26c firmly secured to the opposite longitudinal end portion 21d of the first cover strip 21. Strip 24, also being an intermediate resiliently flexible strip in the unit 20, includes the two longitudinally free-ended strip portions 24a and 24b in common interconnected by a longitudinally generally central connective portion 24c which is firmly secured to a longitudinally generally central portion 21e of the first cover strip 21. Strip 27, which is a second resiliently flexible cover strip and is laterally opposite the first cover strip 21, comprises the two longitudinally free-ended strip portions 27a and 27b, which in common are interconnected by a longitudinally generally central connective strip portion 27c firmly secured to portion 21e of the first cover strip 21.

Visco-elastic means 28, preferably of tacky grade, is disposed between and visco-elastically engages the first cover strip portion 21b and the longitudinally free-ended intermediate and second cover strip portions 22a, 24a, 25a and 27a in the first sequence, and is between and visco-elastically engages the first cover strip portion 21c and the longitudinally free-ended intermediate and second cover strip portions 23a, 24b, 26a and 27b in the second sequence and, as preferred, the connective portions 22c, 23c, 24c, 25c, 26c and 27c are laterally offset in the sequence progressively from the first cover strip 21 by lateral spacer means which in the present embodiment includes shims 29 through which the firm securements to the first cover strip 21 are made as with a firm-setting adhesive. The longitudinally free-ended intermediate strip portions 22a, 23a, 24a, 24b, 25a and 26a are longitudinally foreshortened to allow those portions to co-act longitudinally relatively movably laminarly with the first cover strip portions 21b and 21c and the laterally free-ended second cover strip portions 27a and 27b in the respective sequences and have the visco-elastic means 28 damp vibrations when the unit 20 is flexed. Cover strips 21 and 27 advantageously lengthwise and widthwise substantially fully interpose the intermediate strips 22, 23, 24, 25 and 26 therebetween along with the visco-elastic means 28 and the shim means 29 and also in the present embodiment the first and second cover strips are substantially equal in length and width having the longitudinally free-ended portions 27d and 27e of the second cover strip 27 longitudinally movably substantially fully cover the connective longitudinal end portions 25c and 26c of the adjacent intermediate strips 25 and 26 while engaged therewith by the visco-elastic means 28. Unit 20 is adapted to have the outside face of the first cover strip 21 secured as by adhering with a firmly settable two part epoxy cement so as to be a vibration damping component of a vibratile product.

Figure 8:
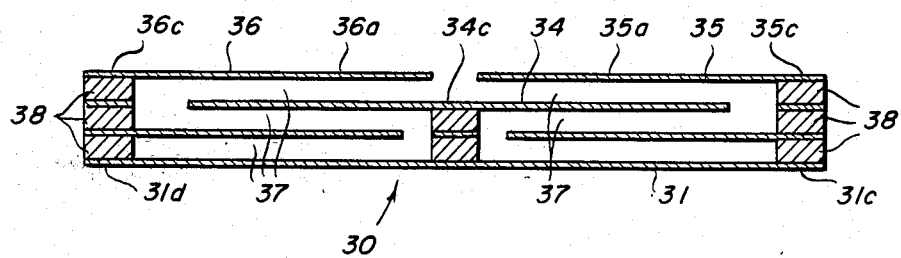

In a modified embodiment in accordance with this invention, and represented in FIG. 8, a vibration damping unit 30 depends upon having the second cover strip means include a pair of longitudinally free-ended cover strip portions 35a and 36a of a pair of second cover strips 35 and 36, and the unit 30 otherwise is similar to that in the FIG. 7 embodiment. Connective longitudinal end portions 35c and 36c of the pair of second cover strips 35 and 36 are firmly secured through shim means 38 to the longitudinal end portions 31c and 31d of the first cover strip 31. The pair of second cover strips 35 and 36 are longitudinally foreshortened with reference to one another adjacent to the connective portion 34c of the intermediate strip 34 and are visco-elastically engaged with the latter strip by visco-elastic means 37 in the unit 30.

Figure 9:
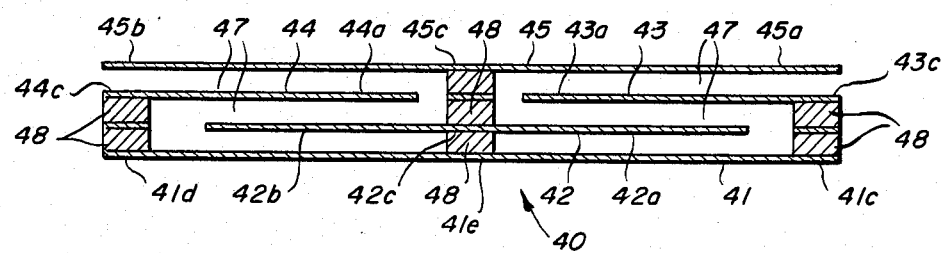

Vibration damping unit 40 according to a still further embodiment of this invention is represented in FIG. 9, and is intended for use with a vibratile product such as in a manner hereinbefore described and provides also two sequences of lapping of resiliently flexible strips in conjunction with visco-elastic means interengaging the strips. Thus, a pair of strips 42 and 45 at longitudinally generally central connective strip portions 42c and 45c thereof are firmly secured through portions of spacer means 48 to the longitudinally generally central portion 41e of a first cover strip 41, the strip 45 being a second cover strip and strip 42 being an intermediate strip. Intermediate strips 43 and 44 in the unit 40 have connective longitudinal end portions 43c and 44c firmly secured through other portions of the spacer means 48 to opposite longitudinal end portions 41c and 41d of the first cover strip 41 and include longitudinally free-ended strip portions 43a and 44a which are longitudinally lapped with longitudinally free-ended portions 42a and 42b of strip 42 and with longitudinally free-ended portions 45a and 45b of the second cover strip 45 in the presence of visco-elastic means 47 which interengages visco-elastically the several strips in unit 40 for the strips to move relatively to one another longitudinally when the unit 40 is flexed in response to vibratile product vibrations.

A modified form of vibration damping unit 60, also within the scope of the present invention, is represented in FIGS. 10 and 11 and has the laminarly superimposed flexible resilient strips 61, 62, 63 and 64 thereof curved in the plane of the strip and curving from longitudinal end to longitudinal end of the strip. Furthermore, the strips 62, 63 and 64 have widths similar to that of strip 61 and are firmly secured in a sequence to strip 61 through shims 65 and 66 in a manner similar to that in the sequence in FIG. 1. Visco-elastic means 60a is situated between the several strips 61, 62, 63 and 64 and visco-elastically engages those strips for the visco-elastic means 60a to damp vibrations which cause the strips 61, 62, 63 and 64 to flex, and relatively move longitudinally with reference to one another.

As illustrative of damping vibrations of tennis rackets in accordance with the present invention, reference is had to a tennis racket 70 represented in FIGS. 12 to 17. One of the curved vibration damping units 60 is operatively applied leading longitudinally along one side of outermost end portion 71a of the racket string frame 71. In the present embodiment, a notch 72 is provided in the aforementioned side of the outermost string frame portion 71a and has a depth which is substantially equal to the over-all thickness of the damping unit 60, and a width which is slightly more than equal to the length of unit 60, so that the outer face afforded by strip 62 in unit 60 is substantially flush with the related side facial areas of the racket string frame 71 which lead away from notch 72. The width of unit 60 is substantially equal to the width of the curved string frame 71 along the notch 72, thus for the unit 60 substantially to fill the latter notch in view of the other dimensional interrelations hereinbefore described. Strip portion 61 of the unit 60 is secured to the base of notch 72 as by means of a two part epoxy adhesive. In a modified FIG. 18 embodiment, two of the vibration damping units 60 are installed laterally opposite one another in opposite sides of the outermost end portion 71a' of the string frame 71' of tennis racket 70', and are interrelated with notches 72' in the string frame 71' and connected with racket 70' as cementing strips 61' thereof in place in a manner hereinbefore described with reference to FIG. 14, for co-operatively damping vibrations in the outermost end portion 71a' of the string frame 71'.

Turning again to FIG. 12, and also having reference also to FIGS. 16 and 17, it will be seen that the tennis racket 70 is further equipped with a vibration damping unit 80 which for example is of a type described hereinbefore with reference to FIG. 1. One end portion of damping unit 80 is situated inside a hollow handle 75 of racket 70 and projects outside an opening from the inner end 75a of the handle, thence bridging across the racket handle crotch space over to the innermost end portion 71b of the string frame 71. A notch 73 into one side of the innermost end portion 71b of the string frame 71 is slightly more than equal in width to the width of vibration damping unit 80, and substantially equal in depth to the thickness of damping unit 80, thereby receiving one longitudinal end of the latter damping unit and having that one end firmly secured in place to the base of notch 73 at the outside face of the flexible strip of the unit which has the longitudinally free-ended strips of the unit firmly longitudinally relatively movably secure thereto. This same strip outside face in the damping unit 80 is firmly secured to the racket handle 75 inside the hollow of handle 75 so as to have unit 80 effective for amplifying the stroking force of racket 70 by rigidifying the racket and for damping vibrations in racket 70 which otherwise would be intensified in the handle 75. Notably, too, the innermost portion 71b of the string frame 71 of racket 70, as represented in FIGS. 13 and 15, has a notch 76 in the side face thereof which is opposite the notch 73. Notch 76 is wider than notch 73 so as to receive a curved vibration damping unit 85 which is similar to but somewhat longer than the curved damping unit 60 hereinbefore described. Vibration damping unit 85 is dimensioned and installed in the spring frame notch 76 so as operatively to be substantially flush with the string frame faces outside the notch 76, for thereafter damping vibrations in the innermost end portion 71b of the string frame 71 while the racket 70 is in use.

In a modified embodiment represented in FIG. 19 and which is similar otherwise to that of FIG. 12, a wide notch 77 is added in the innermost end portion 71b of the string frame 71 and feeds at the center into a secondary narrower notch 73'. Notch 77 accommodates another one of the curved vibration damping units 85 having the latter firmly secured operatively to the string frame opposite the other damping unit 85 to damp vibrations in the innermost end portion 71b of the string frame. Meanwhile, the position of the adjacent end of the substantially straight vibration damping unit 80 has been modified to be within notch 73' behind the covering vibration damping unit 85 in notch 77 for the damping unit 80 as thus installed to operate in a position and manner similar to that hereinbefore described with reference to FIG. 12.

In certain embodiments, such as that represented in FIGS. 20, 21 and 22, two of the substantially straight vibration damping units 80 are used extending from opposite sides of the lowermost end portions 71b of the racket string frame 71 into the handle 75, co-operatively to damp vibrations in the racket while a pair of curved vibration damping units 85 are used on opposite sides of the innermost end portion of the string frame 71 for damping vibrations of the string frame 71.

In an embodiment of this invention according to FIG. 23, a laminar vibration damping unit 90, provided to be used as a component of a vibratile product, includes a plurality of flexible resilient bi-furcated strips 91, 92, 93 and 94 which contribute as portions of a framework of unit 90 wherein the stem strip members 91a, 92a, 93a and 94a are laminarly superimposed, the furcations or branch strip members 91b, 92b, 93b and 94b are laminarly superimposed and the furcations or branch strip members 91c, 92c, 93c and 94c are laminarly superimposed. The bi-furcated strips 92, 93 and 94 in the flexible framework of unit 90 are firmly secured to the bi-furcated strip 91, the firm securements as by cementing for strips 92 and 94 being made adjacent to the ends of the stem strip members 92a and 94a through shims 95 to the corresponding end portion of the stem strip member 91a, leaving the stem strip member 93a longitudinally free-ended at 93d. Branch strip members 93b and 93c of strip 93 are firmly secured through shims 96 and 97 as by cementing to branch strip members 91b and 91c of strip 91, leaving the strip 92 longitudinally doubly free-ended as seen at 92d and 92e and the strip 94 longitudinally doubly free-ended as seen at 94d and 94e. The strips 91, 92, 93 and 94 accordingly in the framework are longitudinally relatively movable with reference to one another when the framework is flexed. The strips 91, 92, 93 and 94 are interengaged by a visco-elastic substance 98, which damps the relative longitudinal movements of the strips 91, 92, 93 and 94 when the vibration damping unit 90 is flexed. The branch strip members 91b, 92b, 93b and 94b and the branch strip members 91c, 92c, 93c and 94c may be provided curved in the plane of the strip bi-furcation, if it is desired to have the vibration damping unit 90 conform to a given related curvature of a vibratile product with which the damping unit is to be used. For equipping a tennis racket 100 in accordance with FIGS. 23, 24 and 25, curvature is introduced in the furcations of unit 90 to conform to curvature of tennis racket crotch-forming frame members 104 and 105 (see FIG. 24) which lead from an innermost end portion 102b of the string frame 102 in the tennis racket 100 and merge with the racket hollow handle structure 101. As will be understood from FIGS.

23 and 25, the stem strip portions 91a, 92a, 93a and 94a of the damping unit 90 framework are substantially straight for the stem of unit 90 to extend from the furcations into the inner end of the hollow handle 101. Unit 90 has the outer face of the bi-furcated strip 91 firmly secured to racket 100 inside the handle 101 and to side surfaces of the racket on the crotch-forming members 104 and 105 outside the handle 101, thus for the unit 90 to damp vibrations initiated in the string frame 102 of the racket 100 and amplify stroking power of the racket by rigidifying the racket. If desired, another unit 90 (not shown) may be introduced upon the racket crotch-forming frame members 104 and 105 on the opposite side of the racket 100 from the first unit 90 and into handle 101, thus for two units 90 co-operatively to damp vibrations in the racket.

Vibration damping units in accordance with the present invention, when produced to be substantially flat initially in the plane of the flexible strip portions of the framework therein, are readily installed substantially flat against a corresponding substantially flat surface of a vibratile product which is to be vibration damped by the damping unit. Up to limits, the substantially flat vibration damping units may be flexed, thereby arching or curving the laminar group or groups of the flexible strip portions of the framework out of the planes of those flexible strip portions in the laminar group or groups in the units, so as to provide a curvature of the damping unit substantially in conformity to a corresponding curvature of a face of the vibratile product to which the damping unit operatively is to be secured. Especially to avoid bending of a substantially flat vibration damping unit beyond permissible limits, curved vibration damping units also are produced in accordance with this invention, having the laminar group or groups of flexible strip portions of the damping unit framework curved to retain substantially sharp curvatures laminarly in the group or groups in a relaxed condition of the framework. One of the latter types of vibration damping units is represented in FIG. 26 and is designated in general by the reference numeral 10". Damping unit 10" is similar in construction to the hereinbefore described damping unit 10 in the FIG. 1 embodiment, except that with having the flexible framework in unit 10" in a relaxed condition the flexible resilient laminarly related arched strip portions 11", 12", 13", 14" and 15", joined by the visco-elastic means 17", are sharply curved in the laminar group retentively out of the planes of those strip portions in the laminar group, the curvatures being substantially equivalent to curvatures having radii of less than say about six inches, so that the damping unit 10" more readily conforms, in being installed, to the supporting face of a tennis racket 110 represented in FIGS. 27 to 30 herein. Notably, in FIGS. 29 and 30, there are notches 112 and 113 entering from the opposite sides and inner rim of racket 110 in the outermost portion 111a of the string frame 111 of the racket, and there are notches 114 and 115 entering from the opposite sides and inner rim of racket 110 in the innermost portion 111b of the string frame 111 of the racket, and each of these notches has one of the vibration damping units 10" secured therein to the racket string frame 111 for damping vibrations in the racket. The longitudinal racket springs 116 pass between adjacent laminar sides of the units 10" into the string frame 111. If desired, of course, one of the units 10" may be omitted from each of the outermost and innermost portions 111a and 111b of the racket frame 111, or only one of the units 10" may be used in the racket 110, selectively in one of the four positions represented in FIGS. 27 to 30. Supplemental vibration damping means (not shown) may if desired be added to racket 110 in any event, such as by connecting a bi-furcated damping unit 90 (not shown) according to FIG. 24 to racket 110 in a manner akin to FIGS. 24 and 25.

Vibration damping unit 30' being a modification of the damping unit of FIG. 8 and represented in FIG. 31 is for example generally rectangular in plan. Unit 30' is characterized by the addition of hollow rivets 119, 120 and 121 which pass through bores through the related flexible resilient strip portions and the shim means 38' of the unit 30' in the regions wherein the hollow rivets 119, 120 and 121 either supplement the firm securements had by cementing in a manner hereinbefore described with reference to FIG. 8 or act alone as clamps to effect the firm securements. Unit 30' lends itself to being installed as a component of a vibratile product 115 by cementing strip 31' to the body of the vibratile product and/or by screws 122, 123 and 124 or other suitable headed fasteners which lead through the hollow rivets 119, 120 and 121 and engage the unit 30' with the body of the vibratile product 115. As installed, the unit 30' avails upon visco-elastic means 37' therein to produce a vibration damping action when unit 30' is flexed in response to vibrations in the body of the vibratile product 115. Notably, the visco-elastic material 37' longitudinally reaches between the strip portions one and next in the groups about as far as the side faces of the strip portions one and next directly oppose one another.

Each of the vibration damping units 130, 140, 150 and 160 represented as still further embodiments of this invention in FIGS. 32, 33, 34 and 35 respectively are by way of example generally rectangular in plan. Unit 130 in FIG. 32 comprises two flexible resilient strip members 131 and 132 laminarly superimposed and of substantially the same rectangular dimensions, and at one set of adjacent longitudinal ends the strip members 131 and 132 are firmly secured together through intermediate shim means 133 as by cementing to produce a flexible framework and have adjacent opposite longitudinal ends 131a and 132a whereby the strips 131 and 132 can relatively be longitudinally moved by flexure. Strips 131 and 132 are engaged at interface by visco-elastic means 134 which retards the relative longitudinal movement of the strips 131 and 132 when the unit flexes in response to vibrations while either having strip 131 or strip 132 secured to a vibratile product.

Vibration damping unit 140 in the FIG. 33 embodiment is similar to the unit 130 of FIG. 32, but has three flexible resilient strips 141, 142 and 143 laminarly superimposed and firmly secured together at first longitudinal ends through shims 144 to provide adjacent longitudinally-free opposite ends 141a, 142a and 143a. Visco-elastic means 145 interfacially engaging the strips 141, 142 and 143 enables unit 140 to damp vibrations while secured at the outer face of either strip 141 or 143 to a vibratile product as a component thereof.

In the vibration damping unit according to FIG. 34, there are three flexible resilient laminarly superimposed generally rectangular strips 151, 152 and 153 dimensioned substantially alike rectangularly so as to present a first set of adjacent longitudinally free ends 151a, 152a and 153a and an opposite set of adjacent longitudinally free ends 151b, 152b and 153b. Centrally of the aforementioned sets of longitudinally free ends, the flexible strips 151, 152 and 153 are firmly secured together through interposed shim means 154 as by cementing. A first group of flexible strip portions 151c, 152c and 153c and a second group of flexible strip portions 151d, 152d and 153d are in a resulting flexible framework. Visco-elastic means 155 between the strip portions in the groups engages the strip portions in the groups for visco-elastically retarding relative longitudinal movements of the strips in the groups in response to vibrations of a vibratile product with unit 150 secured at either strip 151 or 153 to the vibratile product.

Structurally, the flexible framework of vibration damping unit 160 in FIG. 35 includes a first elongated flexible resilient rectangular strip 161 and two additional flexible resilient rectangular strips 162 and 163 of substantially the same width as strip 161. First ends of the strips 162 and 163 are firmly secured to opposite longitudinal ends of strip 161 through shim means 164 as by cementing, having the flexible strips 162 and 163 laminarly disposed over flexible portions 161a and 161b respectively of the strip 161, and with the longitudinally free ends 162a and 163a of strips 162 and 163 forming an appreciable gap with one another substantially centrally between the longitudinal ends of strip 161. The framework of unit 160 accordingly includes as flexible portions thereof the strip members 161a and 162 in a first group and the strip members 161b and 163 in a second group. The flexible framework strip portions are visco-elastically interengaged by visco-elastic means 165 between the strip portions in the groups. When the unit 160 is secured at the outer face of strip 161 to a vibratile product so as to flex and respond to vibrations transmitted from the vibratile product, the unit 160 will damp those vibrations.

In certain embodiments still in accordance with this invention the strip portions of the vibration damping unit framework may be firmly united in the framework as by cementing in the group or groups thereof without use of shim means for spacing. It will be seen for example, in this respect, that in the vibration damping units 130, 140, 150 and 160, the shim means used serves to space the flexible strip portions within the group or groups apart from one another without there being a strip portion in the group to enter between shimmed-apart strip portions in the group. Therefore, the spacing produced by the shim means, between the strip portions of the flexible framework in units 130, 140, 150 and 160, primarily allows for the presence of the visco-elastic means, and where the visco-elastic means, such as a spread-thin tacky adhesive substance, calls for minimum space between the related strip portions, the shim means is sometimes omitted.

As the invention lends itself to many possible embodiments and as many possible changes may be made in the embodiments hereinbefore set forth, it will be distinctly understood that all matter described herein is to be interpreted as illustrative and not as a limitation.

I claim:

1. A discrete flexible vibration damping unit to co-extend with a vibratile product for sensing and damping vibrations of said product, said unit including; a framework comprising laminar group and framework portion means and said means including, a laminar group of flexible strip members of said framework having opposed side faces directly confronting one another interiorly of said group, with there being a flexible first strip member in said group, and all other of said flexible strip members in said group, including a flexible strip member next to said first strip member, being longitudinally movably free-ended and connected in said framework with said flexible first strip member in said group, and said laminar group and framework portion means having portions of said framework interconnected in said framework through said flexible first strip member in said group and said framework portions to be secured to said vibratile product with said unit co-extending with said product side facially of said framework toward said product, for said flexible strip members in said group to be flexed from side to side and longitudinally relatively move with reference to one another having said all other of said flexible strip members in said group remain connected with said flexible first strip member and longitudinally movably free-ended, when said group is flexed between said framework portions; and a tacky visco-elastic substance longitudinally reaching between said opposed side faces of all of said flexible strip members in said group about as far as said opposed side faces of one and next of said flexible strip members in said group longitudinally co-extend directly opposing one another, and said tacky visco-elastic substance directly visco-elastically interengaging said opposed side faces with one another in said group, for said unit to have said flexible strip members in said group flex from side to side and be retarded in said relative longitudinal movements thereof by said tacky visco-elastic substance when said flexible unit is on said vibratile product co-extending with said product side facially of said framework toward said product while having said framework portions secured to said product and said unit is responding to vibrations of said product by flexing between said framework portions, with said all other of said flexible strip members in said group remaining connected with said flexible first strip member in said group and longitudinally movably free-ended.

2. A discrete flexible vibration damping unit as set forth in claim 1, wherein said flexible first strip member in said group is an outside member of said framework.

3. A discrete flexible vibration damping unit as set forth in claim 1, wherein flexible longitudinally movably free-ended strip members in pair in said group are connected with said first strip member in said group through two said framework portions and lead in opposite longitudinal directional senses with reference to one another toward their longitudinally movably free ends, having one of said strip members in said pair directly between the other of said strip members in said pair and said first strip member, and having said other strip member in said pair laterally offset from said first strip member by spacer means in one of said two framework portions to tolerate said one strip member in said pair being between said other strip member in said pair and said first strip member.

4. A discrete flexible vibration damping unit as set forth in claim 1, wherein a pair of flexible longitudinally movably free-ended strip members in said group leading longitudinally in the same directional senses toward their longitudinally movably free ends, and a third longitudinally movably free-ended strip member in said group directly between said pair of strip members and leading in an opposite longitudinal directional sense with reference to said pair of strip members toward said longitudinally movably free-end of said third strip member, are connected through two said framework portions to said first strip member in said group, having said strip members in said pair laterally offset from one another by spacer means in one of said framework portions to tolerate said third strip member being between said pair of strip members.

5. A discrete flexible vibration damping unit as set forth in claim 1, wherein said flexible strip members in said group are inherently longitudinally curved.

6. A discrete flexible vibration damping unit as set forth in claim 1, wherein said unit bodily is inherently longitudinally curved convexly and concavely edgewise of said framework, for said framework portions to be secured to said vibratile product having said unit bodily longitudinally curved and said framework side facially toward said product.

7. A discrete flexible vibration damping unit as set forth in claim 1, wherein said unit bodily is inherently longitudinally curved convexly and concavely side facially of said framework for said framework portions to be secured to said vibratile product having said unit longitudinally curved and said framework side facially toward said product.

8. A discrete flexible vibration damping unit as set forth in claim 1, wherein said first and longitudinally movably free-ended flexible strip members in said group are bifurcated flexible strip members having stem-strip portions laminarily interrelated and furcations laminarly interrelated.

9. A discrete flexible vibration damping unit as set forth in claim 1, wherein at least some of said flexible strip members in said group, and including said flexible first strip member and said flexible longitudinally movably free-ended strip member in said group, are provided integral with connective components of said framework in one of said framework portions, having said connective components kept together in said framework portion by hollow connector means of said framework through apertures in said connective components, with said hollow connector means being open through said framework portion enabling headed fastener means to be received through said hollow connector means in securing said framework portion to said vibratile product.

10. A discrete flexible vibration damping unit as set forth in claim 1, with said unit, as a component of said vibratile product, being located having said framework portions secured to said product, with said unit co-extending with said product having said framework sidewise toward said product, for said unit to respond to vibrations of said product.

11. A discrete flexible vibration damping unit as set forth in claim 1, with said unit, as a component of a ski, being spot-located interiorly of said ski, having said framework portions secured to said ski with said framework being sidewise toward said ski, for said unit to respond to vibrations of said ski.

12. A discrete flexible vibration damping unit as set forth in claim 1, with said unit, as a component of a ski, being spot-located exteriorly of said ski, having said framework portions secured to said ski with said framework sidewise toward said ski, for said unit to respond to vibrations of said ski.

13. A discrete flexible vibration damping unit as set forth in claim 1, with said unit, as a component of a string frame and handle implement, being located having said unit framework portions secured to said implement with said unit framework being sidewise toward said implement, for said unit to respond to vibrations of said implement.

14. The combination as set forth in claim 13, wherein said unit has said unit framework portions secured to said string frame, with said unit framework being sidewise toward said string frame.

15. The combination as set forth in claim 13, wherein said unit extends along said handle and adjacent to said string frame, having said unit framework portions secured to said implement and said unit framework be sidewise toward said implement, for said unit to damp vibrations from said string frame to said handle.

16. A discrete flexible vibration damping unit to co-extend with a vibratile product for sensing and damping vibrations of said product, said unit including; a framework comprising laminar group and framework portion means and said means including, a laminar group of outside and intermediate flexible strip members all one and next having opposed side faces directly confronting one another interiorily of said group, with there being a flexible first strip member in said group and all other of said flexible strip members in said group being longitudinally movably free-ended strip members connected in said framework with said flexible first strip member, and said longitudinally movably free-ended strip members in said group being at least a pair in number and leading in opposite longitudinal directional senses in said pair toward longitudinally movably free ends of said pair and being flexibly interconnected with one another in said pair through said flexible first strip member in said group, and said laminar group and framework portion means having portions of said framework interconnected in said framework through said flexible first strip member in said group and said framework portions to be secured to said vibratile product with said unit co-extending with said product side facially of said framework toward said product, for said flexible strip members in said group to be flexed from side to side and longitudinally relatively move with reference to one another having said all other of said flexible strip members in said group remain connected with said flexible first strip member and longitudinally movably free-ended, when said group is flexed between said framework portions; and a tacky visco-elastic substance longitudinally reaching between said opposed side faces of all of said flexible strip members in said group about as far as said opposed side faces of one and next of said flexible strip members in said group longitudinally co-extend directly opposing one another, and said tacky visco-elastic substance directly visco-elastically interengaging said opposed side faces with one another in said group, for said flexible unit to have said flexible strip members in said group flex from side to side and be retarded in said longitudinal relative movements thereof by said tacky visco-elastic substance when said unit is on said vibratile product co-extending with said product side facially of said framework toward said product while having said framework portions secured to said product and said unit is responding to vibrations of said product by flexing between said framework portions, with said all other of said flexible strip members in said group remaining connected with said flexible first strip member in said group and longitudinally movably free-ended.

17. A discrete flexible vibration damping unit as set forth in claim 16, wherein said flexible longitudinally movably free-ended strip members in said pair are placed from one side of said flexible first strip member in said group, having one of said strip members in said pair next to said first strip member and directly between the other of said strip members in said pair and said first strip member.

18. A discrete flexible vibration damping unit as set forth in claim 16, wherein all of said longitudinally movably free-ended strip members in said group one after another longitudinally lead in opposite directional senses to their longitudinally movably free ends.

19. A discrete flexible vibration damping unit as set forth in claim 16, wherein said flexible first strip member in said group is an outside member of said framework, and all of said longitudinally movably free-ended strip members in said group one after another longitudinally lead in opposite directional senses toward their longitudinally movably free ends.

20. A discrete flexible vibration damping unit as set forth in claim 16, wherein said first strip member and said pair of longitudinally movably free-ended strip members in said group are bifurcated flexible strip members having stem-strip portions laminarly interrelated and furcations laminarly interrelated.

21. A discrete flexible vibration damping unit as set forth in claim 16, wherein said flexible strip members in said group are inherently longitudinally curved.

22. A discrete flexible vibration damping unit as set forth in claim 16, wherein said flexible longitudinally movably free-ended strip members and said flexible first strip member in said group are provided integral with connective components of said framework in two said framework portions, having said connective components kept together in said two framework portions by hollow connector means through apertures in said connective components, with said hollow connector means being open through said two framework portions enabling headed fastener means to be received through said hollow connector means in securing said framework portions to said vibratile product.

23. A discrete flexible vibration damping unit to co-extend with a vibratile product for sensing and damping vibrations of said product, said unit including; a framework comprising a laminar group of flexible strip members all one and next having opposed side faces directly confronting one another interiorily of said group, with there being a flexible first strip member having a face outside said framework, and all other of said flexible strip members in said group being longitudinally movably free-ended strip members leading one and next in opposite longitudinal directional senses with reference to one another toward their longitudinally movably free ends and being connected at opposite longitudinal ends of said framework with said flexible first strip member in said group and flexibly interconnected through said flexible first strip member in said group, for said flexible strip members in said group to be flexed from side to side and longitudinally relatively move with reference to one another having said all other of said flexible strip members in said group remain connected with said flexible first strip member and longitudinally movably free-ended, when said unit is flexed between said opposite longitudinal ends of said framework; and a tacky visco-elastic substance longitudinally reaching between said opposed side faces of all of said flexible strip members in said group about as far as said opposed side faces of one and next of said flexible strip members in said group longitudinally co-extend directly opposing one another, and said tacky visco-elastic substance directly visco-elastically interengaging said opposed side faces with one another in said group, for said flexible unit to have said flexible strip members in said group flex from side to side and be retarded in said longitudinal relative movements thereof by said tacky visco-elastic substance, when said unit is on said vibratile product co-extending with said product side facially of said framework toward said product, while having said opposite longitudinal ends of said framework secured to said product and said unit is responding to vibrations of said product by flexing between said opposite longitudinal ends of said framework, with said all other of said flexible strip members in said group remaining connected with said flexible strip member in said group and longitudinally movably free-ended.

24. A discrete flexible vibration damping unit to co-extend with a vibratile product for sensing and damping vibrations of said product, said unit comprising; laminar group and framework portion means and said means including, a framework comprising a pair of laminar groups of flexible strip members of said framework having opposed side faces directly confronting one another interiorily of said groups, with there being flexible first strip members, one in each of said groups, and said flexible first strip members in said groups being components in common of a flexible first lamina in said framework, and all other of said flexible strip members in said groups, at least one in number per said group, being longitudinally movably free-ended flexible strip members connected in said framework with said first strip members in said groups, and said laminar group and framework portion means having portions of said framework interconnected in said framework through said flexible first lamina and said framework portions to be secured to said vibratile product with said unit co-extending with said product side facially of said framework toward said product, for said flexible strip members in said groups to be flexed from side to side and longitudinally relatively move with reference to one another in said groups having said all other of said flexible strip members in said groups remain connected with said flexible first strip members in said groups and longitudinally movably free-ended, when said framework is flexed between said framework portions; and a tacky visco-elastic substance longitudinally reaching between said opposed side faces of all of said flexible strip members in said groups about as far as said opposed side faces of one and next of said flexible strip members in said groups longitudinally co-extend directly opposing one another interiorily of said framework in said groups, and said tacky visco-elastic substance directly visco-elastically interengaging said opposed side faces with one another in said groups, for said unit to have said flexible strip members in said groups flex from side to side and be retarded in said relative longitudinal movements thereof by said tacky visco-elastic substance when said flexible unit is on said vibratile product co-extending with said product side facially of said framework toward said product, while having said framework portions secured to said product and said unit is responding to vibrations of said product by flexing between said framework portions, with said all other of said flexible strip members in said group remaining connected with said flexible first strip members in said groups and longitudinally movably free-ended.

25. A discrete flexible vibration damping unit as set forth in claim 24, wherein all of said flexible longitudinally movably free-ended strip members in said groups are longitudinally directed inwardly of said framework in opposite senses toward their longitudinally movably free ends from group to group.

26. A discrete flexible vibration damping unit as set forth in claim 24, wherein all of said flexible longitudinally movably free-ended strip members in said groups are longitudinally directed outwardly of said framework in opposite senses toward their longitudinally movably free ends from group to group.

27. A discrete flexible vibration damping unit as set forth in claim 24, wherein all of said flexible longitudinally movably free-ended strip members in said groups are longitudinally directed in opposite senses toward their longitudinally movably free ends from group to group, and said first lamina is an outside component of said framework.

28. A discrete flexible vibration damping unit to coextend with a vibratile product for sensing and damping vibrations of said product, said unit comprising; laminar group and framework portion means and said means including, a framework comprising a pair of laminar groups of flexible strip members of said framework having opposed side faces directly confronting one another interiorily of said groups, with there being flexible first strip members of said framework, one in each of said groups, and all other of said flexible strip members in said groups being longitudinally movably free-ended flexible strip members connected in said framework with said first strip members in said groups, having said flexible longitudinally movably free-ended strip members in each said group lead one after another in opposite longitudinal directional senses toward their longitudinally movably free ends and be flexibly interconnected by said flexible first strip members in said groups, and said laminar group and framework portion means having portions of said framework interconnected through said flexible first strip members in said groups and said framework portions to be secured to said vibratile product with said vibration damping unit co-extending with said product side facially of said framework toward said product, for said flexible strip members in said groups to be flexed from side to side and longitudinally relatively move with reference to one another in said groups having said all other of said flexible strip members in said groups remain connected with said flexible first strip members in said groups and longitudinally movably free-ended, when said framework is flexed between said framework portions; and a tacky visco-elastic substance longitudinally reaching between said opposed side faces of all of said flexible strip members in said groups about as far as said opposed side faces of one and next of said flexible strip members in said groups longitudinally co-extend directly opposing one another interiorily of said framework in said groups, and said tacky visco-elastic substance directly visco-elastically interengaging said opposed side faces one and next with one another in said groups, for said unit to have said flexible strip members in said groups flex from side to side and be retarded in said relative longitudinal movements thereof by said tacky visco-elastic substance when said flexible unit co-extends with said vibratile product side facially of said framework toward said product while having said framework portions secured to said product and said unit is responding to vibrations of said product by flexing between said framework portions with said all other of said flexible strip members in said group remaining connected with said flexible first strip members in said groups and longitudinally movably free-ended.

29. A discrete flexible vibration damping unit as set forth in claim 28, wherein two said longitudinally movably free-ended strip members one each next to said first strip members in said groups have ends inner in said framework and lead longitudinally outwardly in said framework from said inner ends in opposite directional senses toward their longitudinally movably free ends.

30. A discrete flexible vibration damping unit as set forth in claim 28, wherein two said longitudinally movably free-ended strip members one each next to said first strip members in said groups have ends outer in said framework and lead longitudinally inwardly in said framework from said outer ends in opposite directional senses toward their longitudinally movably free ends.

31. A discrete flexible vibration damping unit to coextend with a vibratile product for sensing and damping vibrations of said product, said unit comprising; a framework including, opposite longitudinal end and intermediate framework portions and a pair of laminar groups of flexible strip members between said opposite longitudinal end and intermediate framework portions, said flexible strip members in said groups having opposed side faces directly confronting one another interiorily of said groups, with there being flexible first strip members, one in each of said groups, and said flexible first strip members in said groups being components in common of a flexible first strip in said framework, and all other of said flexible strip members in said groups being longitudinally movably free-ended and leading one and next in opposite longitudinal directional senses with reference to one another to their longitudinally movably free ends in said groups while placed from one side of said first strip in said framework and connected with said first strip members in said groups, with the other side of said first strip in said framework being outside said framework, for said flexible strip members in said groups to be flexed from side to side and longitudinally relatively move with reference to one another in said groups having said all other of said flexible strip members in said groups remain connected with said flexible first strip members in said groups and longitudinally movably free-ended, when said groups are flexed between said framework portions and said unit coextends with said vibratile product side facially of said framework toward said product with said framework portions being secured to said product; and a tacky visco-elastic substance longitudinally reaching between said opposed side faces of all of said flexible strip members in said groups about as far as said opposed side faces of one and next of said flexible strip members in said groups longitudinally co-extend directly opposing one another interiorily of said groups, and said tacky visco-elastic substance directly visco-elastically interengaging said opposed side faces with one another in said groups, for said flexible unit to have said flexible strip members in said groups flex from side to side and be retarded in said relative longitudinal movements thereof by said tacky visco-elastic substance when said flexible unit is on said vibratile product co-extending with said product side facially of said framework toward said product while having said framework portions secured to said product and said unit is responding to vibrations of said product by flexing between said framework portions, with said all other of said flexible strip members in said groups remaining connected with said flexible first strip members in said groups and longitudinally movably free-ended.

32. A discrete flexible vibration damping unit as set forth in claim 31, wherein two of said longitudinally movably free-ended strip members in said groups, one each next to said flexible first strip members in said groups, are components of a second strip in said framework having a junction with said first strip in said framework, and lead longitudinally outwardly in said framework in opposite senses from said junction toward their longitudinally movably free ends in said groups.

33. A discrete flexible vibration damping unit as set forth in claim 31, wherein two of said longitudinally movably free-ended strip members in said groups, one each next to said flexible first strip members in said groups, have separate junctions with said first strip in said framework and thence longitudinally lead inwardly in said framework in opposite senses toward their longitudinally movably free ends in said groups.

34. A discrete flexible vibration damping unit as set forth in claim 31, wherein said flexible longitudinally movably free-ended strip members and said flexible first strip members in said groups are provided integral with connective components of said framework in said framework portions, having said connective components kept together in said framework portions by hollow connector means through apertures in said connective components, with said hollow connector means being open through said framework portions enabling headed fastener means to be received through said hollow connector means in securing said framework portions to said vibratile product.

* * * * *